United States Patent
Frey et al.

(10) Patent No.: US 8,330,803 B2
(45) Date of Patent: Dec. 11, 2012

(54) METHOD AND APPARATUS FOR 3D DIGITIZATION OF AN OBJECT

(75) Inventors: Alexander Frey, Bernau (DE); Daniel Kreutzer, Kolbermoor (DE); Thomas Mayer, Kolbermoor (DE); Marcus Steinbichler, Neubeuern (DE)

(73) Assignee: Steinbichler Optotechnik GmbH, Neubeuern (DE)

( * ) Notice: Subject to any disclaimer, the term of this patent is extended or adjusted under 35 U.S.C. 154(b) by 566 days.

(21) Appl. No.: 12/459,640

(22) Filed: Jul. 6, 2009

(65) Prior Publication Data

US 2010/0007719 A1 Jan. 14, 2010

(30) Foreign Application Priority Data

Jun. 7, 2008 (DE) .......................... 10 2008 031 942

(51) Int. Cl.
*H04N 13/02* (2006.01)
(52) U.S. Cl. .............. 348/46; 348/50; 348/51; 345/419; 382/154; 702/152; 702/153
(58) Field of Classification Search ............ 348/42–161; 382/154; 345/419; 702/152, 153
See application file for complete search history.

(56) References Cited

U.S. PATENT DOCUMENTS

| 6,515,658 | B1* | 2/2003 | Endoh ........................... 345/419 |
| 2005/0135670 | A1* | 6/2005 | Vaidyanathan ............... 382/154 |
| 2007/0052700 | A1* | 3/2007 | Wheeler et al. ............... 345/419 |
| 2007/0263924 | A1 | 11/2007 | Kochi et al. |
| 2008/0144925 | A1 | 6/2008 | Zhu et al. |
| 2008/0201101 | A1* | 8/2008 | Hebert et al. ................. 702/152 |

FOREIGN PATENT DOCUMENTS

JP 2000-194863 7/2000

* cited by examiner

*Primary Examiner* — Sath V Perungavoor
*Assistant Examiner* — Nathnael Aynalem
(74) *Attorney, Agent, or Firm* — Dilworth & Barrese, LLP

(57) ABSTRACT

In a method for 3D digitization of an object (1), a plurality of camera images of the object are recorded and assembled to determine the 3D coordinates of the object. To improve such method, pictures are taken from the object (1), from which 2D feature points (11, 12, 13; 21, 22, 23) of the object (1) are determined. The 3D coordinates of the 2D feature points are determined. The 2D point correspondences (32, 32, 22) between the 2D feature points of a picture and the 2D feature points of another picture are determined. Several of these 2D point correspondences are selected, and an associated 3D transformation is determined. The quality of this 3D transformation is determined with reference to the transformed 3D coordinates of the 2D feature points. Valid 3D feature points are determined therefrom. For assembling the camera images of the object (1), the 3D coordinates of the valid 3D feature points are used.

13 Claims, 4 Drawing Sheets

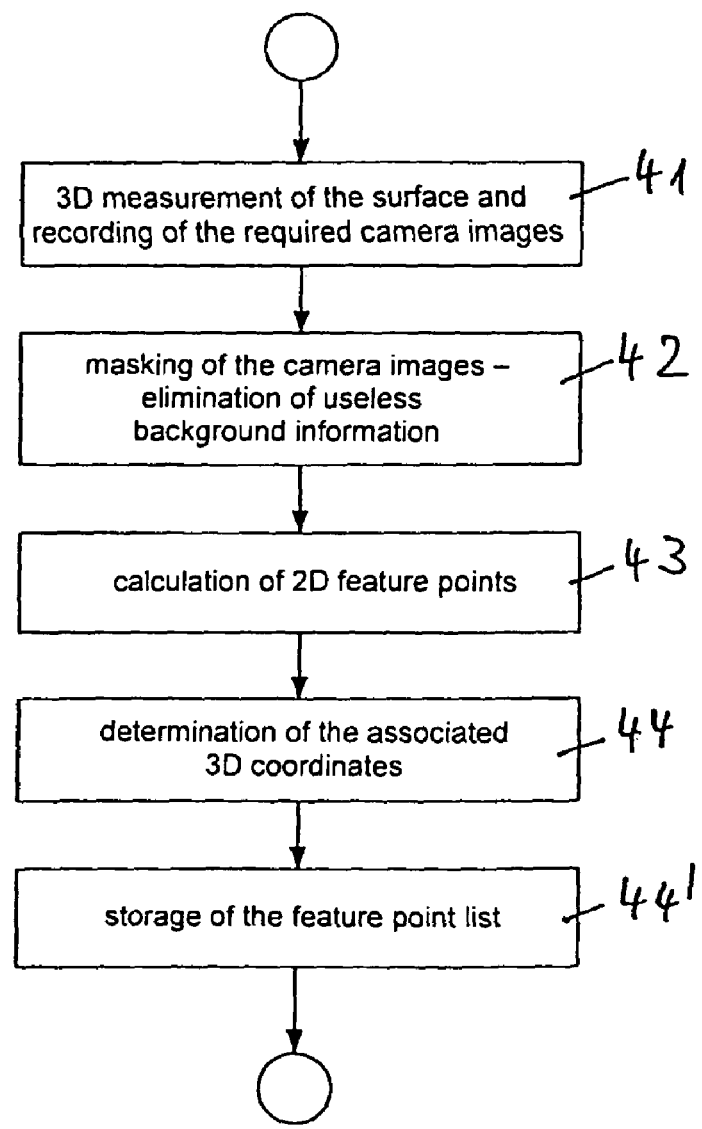

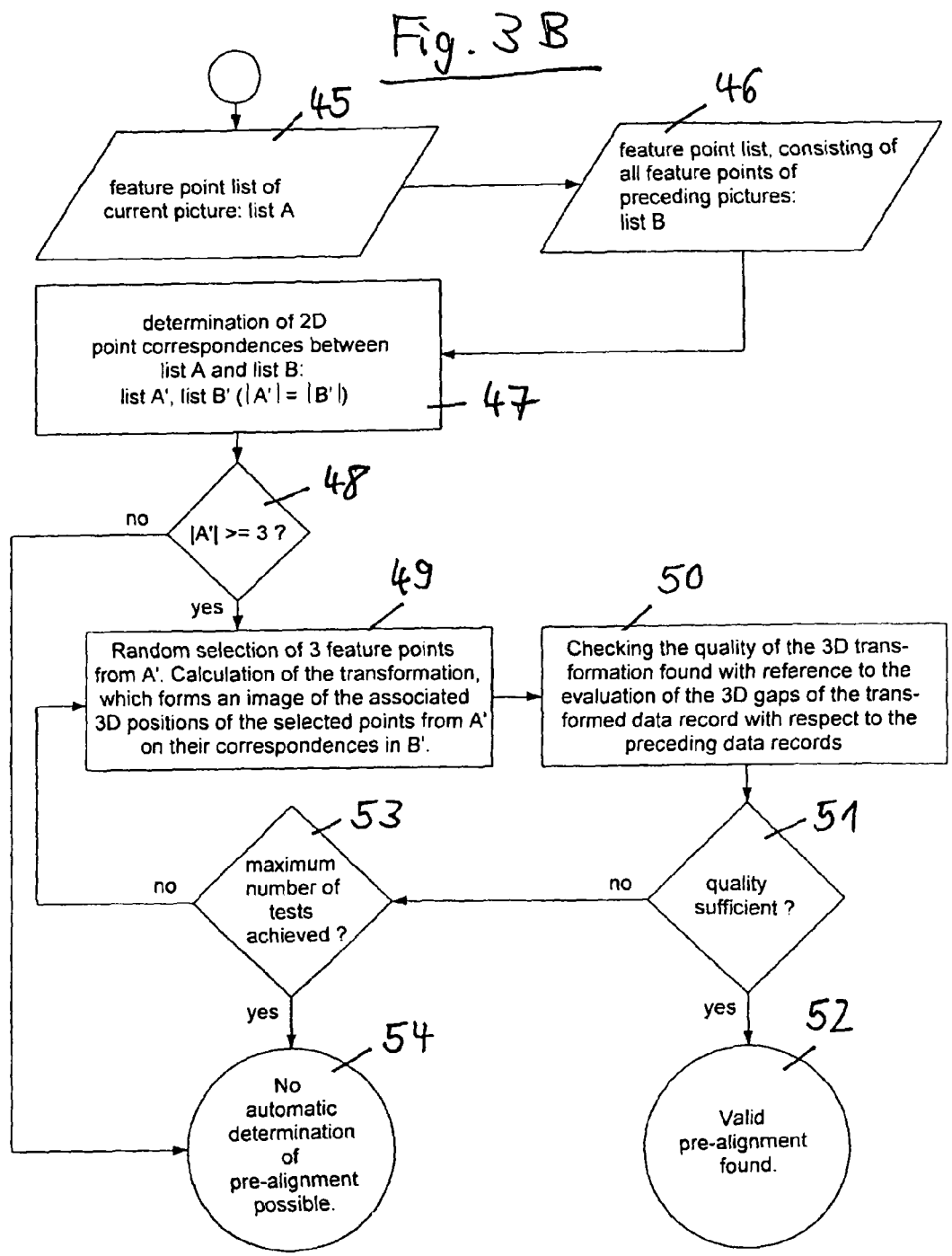

METHOD AND APPARATUS FOR 3D DIGITIZATION OF AN OBJECT

BACKGROUND OF THE INVENTION

This invention relates to a method for 3D digitization of an object, in which a plurality of camera images of the object are recorded and assembled to determine the 3D coordinates of the object.

In the 3D digitization of objects it often is necessary to record several camera images of the object. Adjacent camera images overlap each other. They can then be assembled, in particular by a matching process.

SUMMARY OF THE INVENTION

It is the object of the invention to improve a method and an apparatus as mentioned above for the 3D digitization of an object.

In accordance with the invention, this object is solved by the features herein.

A plurality of camera images of the object are recorded. These are camera images which are suitable for determining the 3D coordinates of the object. In particular, it is possible to apply the method of strip projection, in particular of white-light strip projection. It is, however, also possible to apply a laser scanner method or some other method, with which the 3D digitization of the object is possible. For performing the invention, camera-based methods can be used in particular, in which 3D views of the object are recorded with a camera.

The apparatus for performing the method for 3D digitization of an object can comprise a projector and one or more cameras. The projector and the one or more cameras can be combined to a 3D sensor. The projector can be suitable for projecting a light pattern onto the object, in particular a strip pattern, especially white-light strips. However, the projector can also be suitable for projecting a laser light pattern onto the object, in particular one or more laser lines.

By the camera or cameras, a plurality of camera images of the object can be recorded. The camera images are recorded from different perspectives (views, viewing angles). The camera images cover various regions of the object, which in general partly overlap each other. The various camera images can be assembled, in particular by a 3D matching process. In this way, a greater region of the object or the entire surface of the object can be covered.

When the object has a sufficient 3D structure, it is possible to align individual overlapping camera images with respect to each other by means of a 3D matching process. In prior art solutions, however, this matching requires an additional manual interaction in the measurement sequence, since corresponding 3D points in the various camera images must be marked manually in the data records. This leads to an additional interaction effort and reduces the efficiency of the 3D digitization of the object.

In accordance with the invention, pictures are taken from the object. From these pictures, 2D feature points of the object are determined. As 2D feature points, corners of the object can be used in particular, i.e. intersections of two or more edges of the object. It is, however, also possible to use other points in the picture as 2D feature points, which have a characteristic surroundings. The 2D feature points can be determined automatically, i.e. without manual human interaction.

For each 2D feature point a feature vector can be determined. The feature vector can include the characteristic properties in the surroundings of the 2D feature point. It is possible to use a feature vector which is invariant with respect to certain transformations, for instance invariant with respect to a translation. In particular, the gradient histogram of the neighborhood of the 2D feature point in the picture can be used as a feature vector, i.e. the gradient histogram of the 2D neighborhood of the 2D feature point.

Subsequently, the 3D coordinates of the 2D feature points of a picture are determined, This can be effected on the basis of one or more camera images of the object in conjunction with the projection pattern or patterns (light pattern, strip pattern, white-light strip pattern, laser light pattern, one or more laser lines etc.). In particular, a camera image can be used, which has been recorded from the same perspective. When using the white-light strip projection for determining the 3D coordinates of the object, a camera image of the object initially can be recorded for instance with a white-light strip pattern. Subsequently or beforehand, a picture without white-light strips can be taken, from which the 2D feature points can be determined.

Between the 2D feature points of a picture and the 2D feature points of another picture, the 2D point correspondences are determined. In this way, it can be checked whether the 2D feature points of a picture include corresponding 2D feature points in another picture. For determining the 2D point correspondences, feature vectors can be used. In particular, feature vectors can be used, which due to their definition (e.g. gradient histogram of the 2D neighborhood) are invariant with respect to certain transformations (e.g. translation). From the comparison of the feature vectors, corresponding feature vectors and hence corresponding 2D feature points can be determined.

Subsequently, several of the determined 2D point correspondences are selected. From these selected 2D point correspondences an associated 3D transformation is determined. The selection of the 2D point correspondences can be effected at random. Advantageously, three point correspondences are selected.

Since the 3D transformation is based on 2D point correspondences, it cannot be assumed with certainty that this is an applicable, valid 3D transformation. Accordingly, the quality of the determined 3D transformation is determined. This is done with reference to the transformed 3D coordinates of the 2D feature points. The 3D coordinates of the 2D feature points are determined from camera images of the object, which serve to determine the 3D coordinates of the object. The quality of the 3D transformation can be determined from the overlap quality of the 3D coordinates of the 2D feature points, in particular from the 3D gaps. For this purpose, the distance from associated 3D coordinates of the 2D feature points can be calculated. Instead or in addition, the 3D neighborhoods of the 3D coordinates of the 2D feature points can be used for determining the overlap quality. When the distance and/or the 3D neighborhoods satisfy certain quality criteria, in particular when the distance is smaller than a certain specified distance and/or when the deviations in the 3D neighborhoods are smaller than specified deviations, the quality of the 3D transformation can be regarded as sufficient.

When this quality of the 3D transformation is sufficient, the 3D transformation can be regarded as a valid 3D transformation, and the associated 3D coordinates of the 2D feature points can be regarded as valid 3D feature points. For assembling the camera images of the object, the 3D coordinates of the valid 3D feature points then can be used.

Otherwise, when the quality of the 3D transformation is not sufficient, the method can be repeated from the step of selecting several 2D point correspondences: Then, other 2D point correspondences can be selected and an associated 3D transformation can be determined therefrom, whose quality can be determined. This can be repeated several times, until valid 3D feature points can be determined.

Advantageous developments of the method of the invention are described herein.

Advantageously, an object region is determined in each picture, and 2D feature points are used within this object region. The object region of the picture is that region in which part of the object is represented, but not part of the background. Due to the fact that 2D feature points are used within the object region, it is ensured that the 2D point correspondences determined therefrom concern feature points lying on the object surface.

The object region can be distinguished from the background region by the camera images. In particular, it is possible to use the contrast images obtained during production of the camera images which serve to determine the 3D coordinates of the object. These contrast images contain a statement as to the measurement data quality of the 3D coordinates of the object determined therefrom, and a statement as to whether a 3D coordinate determined belongs to the object, i.e. in the object region, or to the background, i.e. in the background region. In this way, the background scene can largely be masked out, and it can be achieved that only 2D feature points within the object region are used. This allows a faster and qualitatively better determination of valid 3D transformations. Furthermore, a better independence of the method from possibly existing disturbing influences such as ambient lighting and scene background can be achieved.

Another advantageous development is characterized in that stored 2D feature points and/or stored 3D feature points and/or stored feature vectors are used. The 2D feature points and/or the 3D feature points and/or the feature vectors can be stored in a feature point list. This is advantageous in particular when several identical objects should be digitized. Then, the complete feature point list of the first complete 3D digitization can be stored and be used as a complete feature point list for the suceeding measurements. Hence it is possible to digitize all subsequently measured objects from any viewing angle in any order. A restriction of the variation of the perspectives (viewing angles) with respect to the preceding perspectives (viewing angles) no longer does exist.

In accordance with another advantageous development, the 2D feature points and/or the 3D feature points and/or the feature vectors are determined from renderings of the CAD data of the object. It is advantageous in particular when 2D feature points and/or 3D feature points and/or feature vectors are used, which were determined from renderings of the CAD data of the object.

This method is advantageous in particular when CAD data of the object are present. Renderings of these CAD data are understood to be photorealistic representations of the CAD data from a certain perspective. It is possible to virtually observe the CAD data model of the object from various perspectives with a virtual camera, which has similar imaging properties as the real camera, and to obtain the 2D feature points from the object views rendered. The feature point list virtually obtained in this way can then be used for performing the method. It can be stored and/or be read out from a memory for performing the method.

The apparatus for performing a method for 3D digitization of an object in accordance with the invention comprises a projector for projecting a light pattern or a laser light pattern onto the object, one or more cameras for recording camera images of the object, a means for assembling the camera images of the object and for determining the 3D coordinates of the object, a camera for producing pictures of the object, and a means for determining 2D feature points of the object, for determining the 3D coordinates of the 2D feature points of the object, for determining the 2D point correspondences between the 2D feature points of a picture and the 2D feature points of another picture, for selecting several of these 2D point correspondences, for determining an associated 3D transformation, for determining the quality of this 3D transformation with reference to the transformed 3D coordinates of the 2D feature points, and for determining valid 3D feature points.

Advantageously, the apparatus includes a means for determining the object region of the picture.

In accordance with another advantageous development, the apparatus includes a memory for storing the 2D feature points and/or the 3D feature points and/or the feature vectors.

Another advantageous development is characterized in that there is provided a means for determining the 2D feature points and/or the 3D feature points and/or the feature vectors from renderings of the CAD data of the object.

BRIEF DESCRIPTION OF THE DRAWINGS

One embodiment of the invention will be explained in detail below with reference to the attached drawing, in which:

FIGS. 3A and 3B show a flow diagram of the method.

DESCRIPTION OF THE PREFERRED EMBODIMENTS

Figure 1:
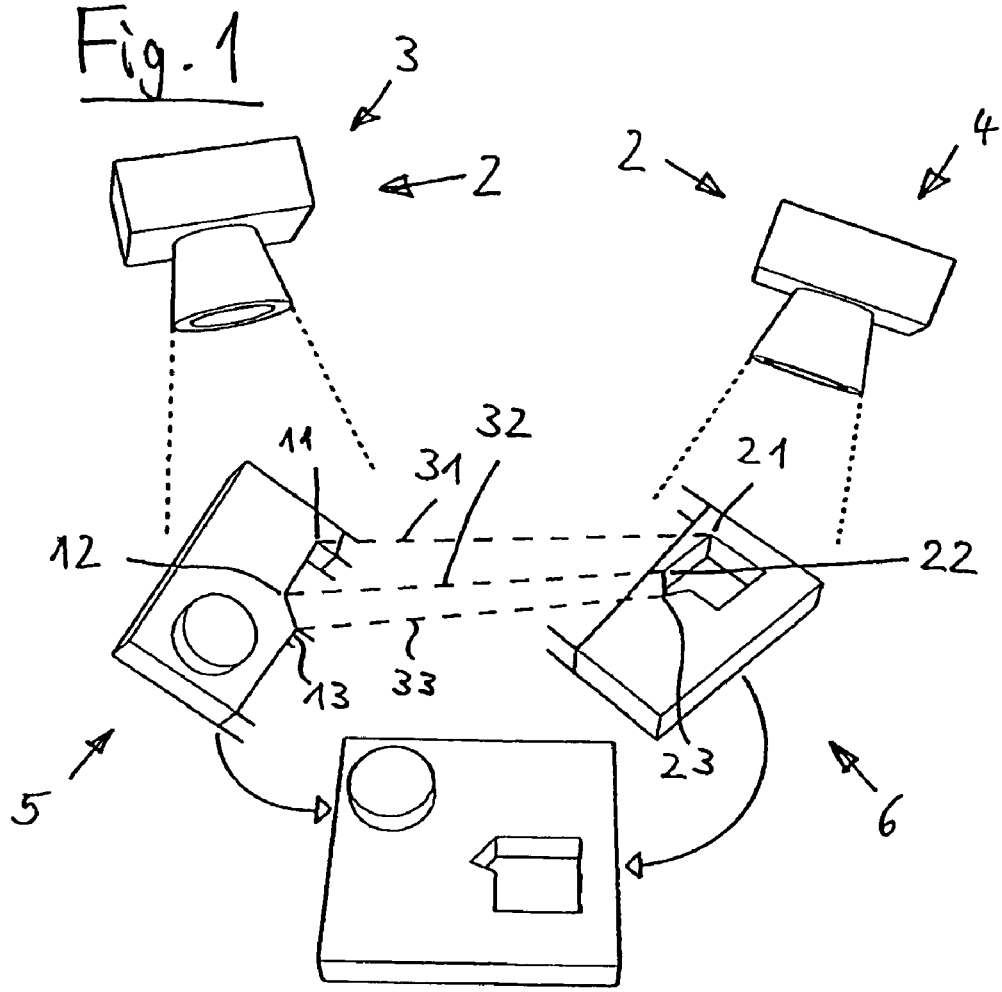
FIG. 1 shows an apparatus for performing a method for 3D digitization of an object.

FIG. 1 shows an embodiment of an apparatus for performing a method for 3D digitization of an object 1. The apparatus comprises a sensor 2, which comprises a camera and a white-light strip projector.

During performance of the method, the sensor 2 initially is in the position designated with 3. In this position, a first camera image of the object 1 is recorded. When recording this camera image, the object 1 is irradiated with white-light strips. The camera image serves to determine the 3D coordinates of the object 1. For this purpose, various methods can be employed. In particular, the spatial phase shift method can be employed, in which the 3D coordinates of the object 1 can be determined from a single camera image. However, it is also possible to employ the time-based phase shift method, in which for determining the 3D coordinates of the object 1 a plurality of camera images, in particular three or four, are recorded.

Furthermore, a picture 5 is taken from the object 1 with the camera of the sensor 2, while the sensor 2 is in the same position, When taking this picture, the object 1 is not illuminated with white-light strips.

Subsequently, the sensor 2 is moved into another position, which in FIG. 4 is provided with the reference numeral 4. In this position, another camera image of the object 1 is recorded, from which the 3D coordinates of the object 1 are determined. When recording this camera image, white-light strips are projected onto the object 1 by the projector of the sensor 2. As mentioned, the 3D coordinates of the object can be determined by a camera image. However, it is also possible to record a plurality of camera images of the object 1, in particular when employing a time-based phase shift method, and to therefrom determine the 3D coordinates of the object 1. While the sensor 2 is in the position 4; a picture 6 is taken from the object 1; during which no white-light strips are projected onto the object 1.

The camera image or images and the picture 5, which are obtained when the sensor 2 is in the position 3, cover the region of the object 1 which is illustrated on the left in FIG. 1. When the sensor is in the position 4, the camera image or images and the picture 6 cover the right-hand region of the object 1. These regions of the object 1 partly overlap each other.

From the pictures 5, 6 of the object 1, 2D feature points are determined. From the left-hand picture 5, the feature points 11, 12, 13 are determined. These feature points lie on corners of the object 1; i.e. on points at which two edges meet.

From the picture 6, which covers the right-hand part of the object 1, the 2D feature points 21; 22, 23 are determined. These 2D feature points also lie on corners of the object 1.

Subsequently, the 3D coordinates of the 2D feature points 11; 12, 13; 21, 22, 23 are determined. The 3D coordinates are determined from the camera images of the object 1.

Furthermore, the 2D point correspondences 31, 32, 33 between the 2D feature points 11, 12, 13 of the left-hand picture 5 and the 2D feature points 21, 22, 23 of the right-hand picture 6 are determined. These 2D point correspondences 31, 32, 33 are illustrated in FIG. 1 in broken lines.

Subsequently, several of these 2D point correspondences 31, 32, 33 are selected. In the case of FIG. 3, the three 2D point correspondences 31, 32, 33 are selected. From these 2D point correspondences, an associated 3D transformation is determined.

Subsequently, the quality of this 3D transformation is determined with reference to the transformed 3D coordinates of the 2D feature points. The 3D transformation thus is applied to the 3D coordinates of the 2D feature points 11, 12, 13; 21, 22, 23.

From the determined quality of the 3D transformation, valid 3D feature points are determined. In FIG. 1, the 3D transformation which belongs to the 2D point correspondences 31, 32, 33 is a valid 3D transformation, i.e. a 3D transformation whose quality is sufficient. From this valid 3D transformation, valid 3D feature points can be determined.

The 3D coordinates of the valid 3D feature points subsequently are used for assembling the left and right camera images of the object 1. This assembly is effected by a 3D matching process. In this way, the object 1 can be assembled correctly, as is shown in FIG. 1.

Figure 2:
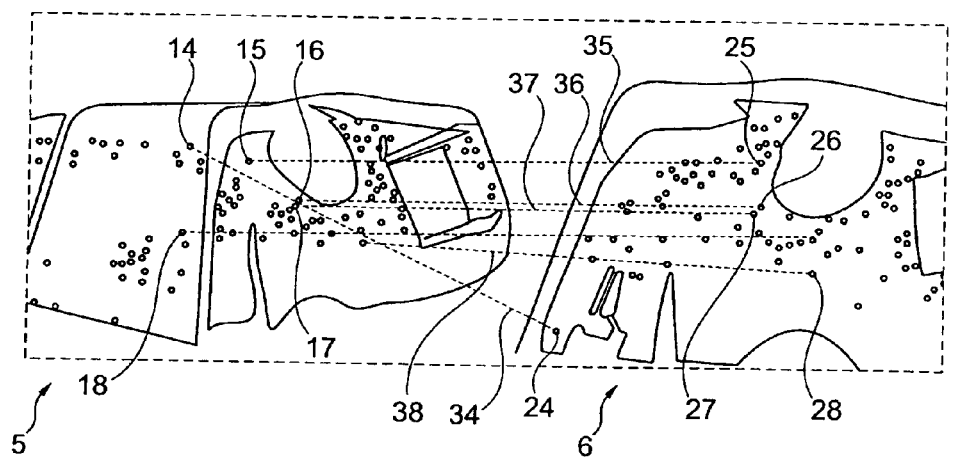
FIG. 2 shows two pictures of an object including the associated 2D feature points.

FIG. 2 shows another object, of which a first picture 5 is represented from a certain perspective and a second picture 6 is represented from another perspective. The regions of the object covered by the pictures 5, 6 partly overlap each other.

On the picture 5, a multitude of the determined 2D feature points is represented, for instance the 2D feature points 14, 15, 16, 17, 18. On the picture 6, the 2D feature points 24, 25, 26, 27, 28 are designated from among the multitude of 2D feature points.

The 2D point correspondences 34, 35, 36, 37, 38 each exist between the 2D feature points 14, 24; 15, 25; 16, 26: 17, 27 and 18, 28.

Three of these 2D point correspondences are selected at random. From these three 2D point correspondences, an associated 3D transformation is determined.

Subsequently, the quality of this 3D transformation is determined with reference to the transformed 3D coordinates of the 2D feature points. When this quality is sufficient, valid 3D feature points are determined therefrom, whose 3D coordinates are used for assembling the camera images, which belong to the picture 5, 6. Otherwise, three other 2D point correspondences are selected, an associated 3D transformation is determined and its quality is determined. This sequence can each be repeated with other three 2D point correspondences, until a valid 3D transformation has been obtained.

FIGS. 3A and 3B each show a flow diagram of the method for 3D digitization of an object.

In a first step 41a 3D measurement of the surface of the object is performed. In this 3D measurement, one or more camera images of the object are recorded for determining the 3D coordinates of the object. The camera image or images are recorded from a certain perspective. From the camera image or images, a part of the object is recorded. These are one or more camera images, from which the 3D coordinates of the object can be determined.

In step 42, the camera image or images are masked. Useless background information is eliminated. In this step, the object region of the camera image or images is determined.

In step 43, 2D feature points are calculated.

In step 44, the associated 3D coordinates of the 2D feature points are determined.

In step 44', the feature point list is stored. The feature point list contains all calculated 2D feature points and the 3D coordinates of all 2D feature points.

Steps 41 to 44' subsequently are repeated with another perspective of the camera. In this camera perspective, another partial region of the object is covered, which partly overlaps with the already covered partial region of the object.

Subsequently, step 45 (FIG. 3B) is performed. The feature point list of the current picture, i.e. initially of the second picture, is used as list A.

In subsequent step 46, the feature point list is formed from all feature points of preceding pictures or retrieved from a memory and used as list B.

In step 47, the 2D point correspondences between list A and list B are determined. Those points of list A and list B, for which 2D point correspondences exist, are formed as lists A' and lists B' and possibly stored. The number /A'/ of the points in list A' is equal to the number /B'/ of the points in list B'.

In step 48, it is checked whether the number of points in lists A' and B' is at least three. If this is not the case, it is noted in step 54 that an automatic determination of the pre-alignment is not possible. In this case, no associated 3D transformation can be determined from the 2D point correspondences.

If the number of points in lists A' and B' is at least three, step 49 is performed after the checking step 48. In step 49, a random selection of three feature points from list A' takes place. Three 2D point correspondences belong to these three feature points, from which an associated 3D transformation is determined. On the basis of this 3D transformation, the transformed 3D coordinates of the 2D feature points are determined. The 3D transformation forms an image of the associated 3D positions of the selected 2D feature points from list A' on their correspondences in list B'.

In step 50, the quality of the 3D transformation found is determined. This is accomplished with reference to the evaluation of the 3D gaps of the transformed 3D coordinates, i.e. of the transformed data record with respect to the preceding data records.

In step 51, it is checked whether this quality is sufficient. If this is the case, it is noted in step 52 that a valid pre-alignment has been found. The determined 3D transformation can be used to assemble the camera images, in particular by a 3D matching process.

Thereafter, the process can continue with step 41 (FIG. 3A).

Otherwise, if it has been noted in step 51 that the quality of the 3D transformation is not sufficient, it is checked in step 53, whether the maximum number of tests is reached. If this is not the case, step 49 is performed again, in that a random selection of three other feature points is effected.

Otherwise, when the maximum number of tests is reached, it is noted in step 54 that an automatic determination of the pre-alignment is not possible.

By means of the invention, a method and an apparatus are created, in which the 3D matching of the camera images can be performed automatically and a user interaction becomes superfluous. Furthermore, this invention can be realized such that a user interaction is at least distinctly reduced. In particular, the process can be performed such that with each object view of a 3D scanner one or more additional pictures of the object can be taken. For this purpose, the camera of the 3D sensor can be used. In addition to the strip image camera images necessary for object digitization, one or more additional pictures can be taken without strip illumination. From these pictures, the 2D feature points of the object can be calculated. As feature points, prominent points of the object, such as geometry edges or contrast edges, can be used in particular.

In general, the quality of the 3D transformation is better when the object view is not varied too much. If no valid 3D transformation can be determined, the method can again be performed with less variation of the object view, so as to obtain a valid 3D transformation. Instead or in addition, the method can be performed with a greater overlap of the visibility region between various object views.

When the quality of the 3D transformation is not sufficient, it furthermore is possible to manually perform a pre-alignment by marking geometrical correspondences.

The 2D feature points can be determined from pictures taken by that camera which also produces the camera images for determining the 3D coordinates of the object.

However, it is also possible to determine the 2D feature points from pictures of a separate camera. Before or after 3D digitization, a series of pictures of the object can be produced with the separate camera, and the 2D feature points of the object can be calculated from these pictures. The feature point list obtained in this way can be used subsequently. It can be loaded into the measurement program before starting the 3D digitization.

When the object has an insufficient structure for 3D digitization, it is possible to create the surface structure required for the process by means of a 2D mark, for instance by a random pattern, which can be applied for instance with a marker pen.

It is possible to indicate the sensor position and the measurement volume live in the 3D space. The feature points determined can be used to determine the sensor position relative to the object. With this information, the position of the sensor measurement volume with respect to the measurement object can be visualized in the data acquisition software on a real-time basis, in order to provide the operator with visual assistance for object and/or sensor positioning. This can be done in particular with a rough, fast 3D pre-measurement.

The invention claimed is:

1. An apparatus for performing a method for 3D digitization of an object comprising,
   a projector for projecting a light or laser pattern onto the object,
   one or more cameras arranged for recording partially-overlapping camera images of the object from different perspective,
   assembling the camera images of the object and determining the 3D coordinates of the object,
   a camera for producing pictures of the object, and
   determining 2D feature points of the object, the 3D coordinates of the 2D feature points of the object, the 2D point correspondences between the 2D feature points of a picture and the 2D feature points of a second picture, selecting a plurality of these 2D point correspondences and determining an associated 3D transformation, determining the quality of this 3D transformation with reference to the transformed 3D coordinates of the 2D feature points, and determining acceptable quality 3D feature points, the method comprising the steps of
performing a 3D measurement of the surface of the object and recording one or more camera images for determining the 3D coordinates of the object,
masking the camera image(s) to eliminate useless background information and determining an object region of the camera image(s),
calculating the 2D feature points of the image(s),
determining the associated 3D coordinates of the 2D feature points,
storing a feature point list which contains all calculated 2D feature points and the 3D coordinates of all 2D feature points,
repeating the preceding five steps with another perspective of the camera in which another partial region of the object is covered which partially overlaps with a previously-covered partial region of the object,
using the feature point list of the second picture as a first list,
forming a feature point list from all feature points of preceding picture(s) or retrieved from a memory as a second list,
determining correspondences between the first and second lists, with points of the first and second lists for which correspondence exist being stored and the number of such corresponding points in the first list equalling the number of corresponding points in the second list,
checking whether the number of such corresponding points in the first and second lists is at least three,
determining automatic determination of pre-alignment is not possible when the number of such corresponding points is less than three and associated 3D transformation from the 2D point correspondences cannot be determined,
when the number of such corresponding points is at least three, randomly selecting three feature points from the first list, determining associated 3D transformation from three 2D point correspondences belonging to these three selected feature points, determining transformed 3D coordinates of the 2D feature points and forming an image of the associated 3D positions of the selected 2D feature points on correspondence with the second list,
determining quality of the 3D transformation found with reference to evaluation of 3D gaps of the transformed 3D with respect to preceding data records,
checking whether the quality is sufficient,
when the quality is sufficient, determining a valid pre-alignment has been found and assembling camera images by a 3D matching process and repeating the process with the first step of performing the 3D measurement of the surface of the object and recording one or more camera images for determining the 3D coordinates of the object,
when the quality is insufficient, determining whether a maximum number of tests has been reached,
again performing the step of randomly selecting three feature points from the first list, determining associated 3D transformation from three 2D point correspondences belonging to these three selected feature points, determining transformed 3D coordinates of the 2D feature points and forming an image of the associated 3D positions of the selected 2D feature points on correspondence with the second list, when the maximum number of tests has not been reached, and determining automatic determination of pre-alignment is not possible when the maximum number of tests has been reached.

2. The apparatus according to claim 1, wherein an object region of the picture is determined.

3. The apparatus according to claim 1, comprising a memory for storing at least one of the 2D feature points, the 3D feature points and feature vectors.

4. The apparatus according to claim 1, wherein at least one of the 2D feature points, the 3D feature points and feature vectors are determined from renderings of CAD data of the object.

5. The apparatus according to claim 1, wherein the light pattern is a white-light strip.

6. The apparatus according to claim 1, wherein the same camera is configured for taking pictures for determining the 2D feature points and producing images for determining the 3D coordinates of the object.

7. The apparatus according to claim 1, wherein the 2D feature points of the object are automatically determined without manual human interaction.

8. A method for 3D digitization of an object from different perspectives, comprising the steps of:

performing a 3D measurement of the surface of the object and recording one or more camera images for determining the 3D coordinates of the object, masking the camera image(s) to eliminate useless background information and determining an object region of the camera image(s), calculating the 2D feature points of the image(s), determining the associated 3D coordinates of the 2D feature points, storing a feature point list which contains all calculated 2D feature points and the 3D coordinates of all 2D feature points, repeating the preceding five steps with another perspective of the camera in which another partial region of the object is covered which partially overlaps with a previously-covered partial region of the object, using the feature point list of the second picture as a first list, forming a feature point list from all feature points of preceding picture(s) or retrieved from a memory as a second list, determining correspondences between the first and second lists, with points of the first and second lists for which correspondence exist being stored and the number of such corresponding points in the first list equalling the number of corresponding points in the second list, checking whether the number of such corresponding points in the first and second lists is at least three, determining automatic determination of pre-alignment is not possible when the number of such corresponding points is less than three and associated 3D transformation from the 2D point correspondences cannot be determined, when the number of such corresponding points is at least three, randomly selecting three feature points from the first list, determining associated 3D transformation from three 2D point correspondences belonging to these three selected feature points, determining transformed 3D coordinates of the 2D feature points and forming an image of the associated 3D positions of the selected 2D feature points on correspondence with the second list, determining quality of the 3D transformation found with reference to evaluation of 3D gaps of the transformed 3D with respect to preceding data records, checking whether the quality is sufficient, when the quality is sufficient, determining a valid pre-alignment has been found and assembling camera images by a 3D matching process and repeating the process with the first step of performing the 3D measurement of the surface of the object and recording one or more camera images for determining the 3D coordinates of the object, when the quality is insufficient, determining whether a maximum number of tests has been reached, again performing the step of randomly selecting three feature points from the first list, determining associated 3D transformation from three 2D point correspondences belonging to these three selected feature points, determining transformed 3D coordinates of the 2D feature points and forming an image of the associated 3D positions of the selected 2D feature points on correspondence with the second list, when the maximum number of tests has not been reached, and determining automatic determination of pre-alignment is not possible when the maximum number of tests has been reached.

9. The method according to claim 8, wherein in each picture an object region is determined and the 2D feature points are used within the object region.

10. The method according to claim 8, wherein at least one of the 2D feature points, the 3D feature points and feature vectors are determined from renderings of CAD data of the object.

11. The method according to claim 8, wherein the light pattern is a white-light strip.

12. The method according to claim 8, comprising the step of using the same camera for taking pictures for determining the 2D feature points and producing images for determining the 3D coordinates of the object.

13. The method according to claim 8, wherein the 2D feature points are automatically determined without manual human interaction.

* * * * *